United States Patent

Miyasaka et al.

(10) Patent No.: US 6,882,305 B2
(45) Date of Patent: Apr. 19, 2005

(54) METHOD AND APPARATUS FOR DETERMINING POSITION

(75) Inventors: Koji Miyasaka, Tokyo (JP); Masakazu Mori, Tokyo (JP); Yuji Kobayashi, Tokyo (JP); Kazuyuki Sakaki, Tokyo (JP); Kenichi Takasu, Tokyo (JP)

(73) Assignees: Mitsui & Co., Ltd., Tokyo (JP); Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 10/193,674

(22) Filed: Jul. 12, 2002

(65) Prior Publication Data

US 2003/0016171 A1 Jan. 23, 2003

(30) Foreign Application Priority Data

Jul. 12, 2001 (JP) ........................................ 2001-211513

(51) Int. Cl.[7] .................................................. G01S 5/14
(52) U.S. Cl. ................................................. 342/357.06
(58) Field of Search ........................ 342/357.06, 357.1, 342/357.13, 357.14, 357.17, 380, 464

(56) References Cited

U.S. PATENT DOCUMENTS

| | | | | |
|---|---|---|---|---|
| 5,319,374 A | * | 6/1994 | Desai et al. ................ 342/387 |
| 5,625,556 A | * | 4/1997 | Janky et al. .................... 701/1 |
| 5,663,735 A | * | 9/1997 | Eshenbach ............. 342/357.15 |
| 5,731,997 A | * | 3/1998 | Manson et al. ............. 702/150 |
| 5,893,044 A | * | 4/1999 | King et al. .................. 701/214 |
| 5,945,944 A | * | 8/1999 | Krasner ................. 342/357.06 |
| 6,114,991 A | * | 9/2000 | Richton et al. ........... 342/357.1 |
| 6,222,483 B1 | * | 4/2001 | Twitchell et al. ....... 342/357.09 |
| 6,253,149 B1 | * | 6/2001 | Wannke ...................... 701/208 |
| 6,430,415 B1 | * | 8/2002 | Agashe et al. ........... 455/456.5 |
| 6,480,145 B1 | * | 11/2002 | Hasegawa ............. 342/357.06 |
| 6,530,023 B1 | * | 3/2003 | Nissl et al. .................. 713/200 |
| 2001/0050633 A1 | * | 12/2001 | Thomas ...................... 342/387 |

FOREIGN PATENT DOCUMENTS

JP     10031083 A  *  2/1998  ............ G04G/5/00

* cited by examiner

*Primary Examiner*—Gregory C. Issing
(74) *Attorney, Agent, or Firm*—Foley & Lardner LLP

(57) ABSTRACT

A method includes determining a first time by a first determining system. The method also includes determining a second time and a spatial position of a terminal receiving the second time, by a second determining system which is different from and independent of the first determining system. The terminal stores, in combination, the first time determined by the first determining system and the second time and the position determined by the second determining system, at each time of determining the spatial position of the terminal, in such a manner that the first time, the second time and the position are arranged in a row when they are outputted, wherein the first and second times are independent of each other.

18 Claims, 4 Drawing Sheets

F I G. 3

```
         latitude    longitude    altitude  GPS time   date      time data
3546.42735806, 13942.21173536, 43.980, 055033.8, 20010417, 00:17:26.08
3546.42735806, 13942.21173536, 43.980, 055034.0, 20010417, 00:17:27.00
3546.42735806, 13942.21173536, 43.980, 055034.2, 20010417, 00:16:27.02
3546.42735806, 13942.21173536, 43.980, 055034.4, 20010417, 00:16:27.04
3546.42735806, 13942.21173536, 43.980, 055034.6, 20010417, 00:16:27.06
3546.42735806, 13942.21173536, 43.980, 055034.8, 20010417, 00:16:27.08
3546.42735806, 13942.21173536, 43.980, 055035.0, 20010417, 00:16:28.00
3546.42735806, 13942.21173536, 43.980, 055035.2, 20010417, 00:16:28.02
3546.42735806, 13942.21173536, 43.980, 055035.4, 20010417, 00:16:28.04
3546.42735806, 13942.21173536, 43.980, 055035.6, 20010417, 00:16:28.06
``` latitude   : 3546.42735806 = the north latitude 35° 46' 42.735"

longitude  : 13942.21173536 = the east longitude 39° 42' 21.173"

altitude   : 43.980 (meters)

GPS time   : 055033.8 seconds after the reset time on the night of Tuesday time data  : the Japanese standard time (JST) data

METHOD AND APPARATUS FOR DETERMINING POSITION

BACKGROUND OF THE INVENTION

1. Field of the Invention

The present invention relates to a method and apparatus for determining a position, more specifically to a method and apparatus capable of determining a position (particularly, a position coordinate) by receiving a radio wave from a satellite.

2. Description of the Related Art

In the GPS, the position coordinate is normally determined on the world ellipsoid (WGS-84) as a reference by receiving a radio wave from a satellite.

The position determination in the GPS can be classified into the static interferometric position determination and the kinematic interferometric position determination.

The static position determination can be regarded as a method of determining a position, wherein several receivers each having an antenna are securely disposed at different points by tripods or the like, and data of carrier wave phase or the like regarding the geodesic position are collected for 30 minutes to several hours by the receivers to determine the base lines securely assigned to the reference points whose coordinates are known.

On the other hand, the kinematic position determination can be regarded as a method of determining a position, wherein a set of an antenna and a receiver is disposed at a stationary reference point whose coordinate is known, and geodesic positions are determined in a short time by sequentially moving another set of an antenna and a movable receiver. In the kinematic position determination, the time necessary for determination at each point is a few seconds, and therefore it is relatively short, compared with that in the static position determination.

The coordinate of the above-mentioned reference point can be determined as a known coordinate from the base point in the WGS-84 system (World Geodesic System 1984) by the static position determination.

As a method of the kinematic position determination in a further developed type, a real time kinematic position determination (hereinafter referred to as RTK) can be used, in which the position can be determined in real time as a result of position determination.

In the RTK, a fixed station comprises an antenna and a receiver associated therewith, which are disposed at a reference point whose coordinate is known, whereas a mobile station comprises another antenna and another receiver associated therewith which sequentially move to determine the position.

In the RTK, radio waves emanating from a plurality of satellites are simultaneously received in both the fixed and mobile stations, and the coordinate of the geodesic point of the mobile station to be determined relative to the known geodesic point of the fixed station can be directly obtained by correlating the position data obtained in the mobile station with those obtained in the fixed station.

In this case, the radio wave having a specific frequency in the fixed station is generally used to transmit the data of geodesic positions from the fixed station to the mobile station.

Actually, a radio wave transmitter (for instance, frequency 400 MHz; output about 10 mW) in the fixed station is always transmitting the data of geodesic position, and at the same time a radio wave receiver in the mobile station receives the transmitted radio wave, so that the receiver is capable of always monitoring the data of geodesic position.

All of the time data used in the GPS survey are supplied from an atomic clock built in each satellite.

The atomic clock has a time-indicating error of less than 1 second to three hundred thousand years, thereby providing an extreme accuracy in time.

However, the time data received by the receiver includes possible errors resulting from various factors before receiving the data, and therefore it cannot be stated that there is an absolute accuracy in the time thus determined. For this reason, the time correction is conventionally carried out in the receiver, based on the time correction coefficients supplied in a navigation message.

In the GPS position determination, the time data at a moment of the position coordinate data being determined is added thereto in some cases. Since the time data is extremely accurate, as described above, the time data are generally obtained by transforming the time data in the receiver.

As a result, it has been recognized that no time correction from the exterior is required, since information on the time treated in the GPS position determination is extremely accurate.

SUMMARY OF THE INVENTION

It is an object of the present invention to provide a method and apparatus for determining a position with a high reliability.

Preferable modes in the present invention are as follows.:

In accordance with a preferable method of the present invention, the following steps are applied; employing two determining systems independent of each other, determining time or a point in time with one determining system, determining a spatial position with the other determining system, and storing the time or the point of time thus determined by the one determining system and the position thus determined by the other determining system in a terminal.

Preferably, one determining system should be a radio clock system, and the other determining system should be a GPS (global positioning system). Furthermore, one determining system should be a clock system can receive the standard time via an internet, and the other determining system should be a GPS (global positioning system).

The terminal should be preferably a mobile device.

A preferable apparatus according to the invention comprises a GPS antenna for receiving a radio wave from a satellite and a GPS receiver for receiving data from the GPS antenna to determine a position. In this case, the GPS receiver includes a processing unit, and thereby the processing unit processes the position coordinate data obtained from the GPS position determination and the time data in another independent time system by correlating them with each other.

Preferably, the GPS receiver includes a GPS receiving unit for receiving the data received from the GPS antennas, memory means for storing data including the data received, a built-in timepiece for indicating time on the basis of quartz oscillation, an interface for input of the time data from an external time system other than the GPS time system, and a time data processing unit for processing the time data input via the interface to form data in an usable format. The processing unit is connected to the GPS receiving unit, the memory means, the built-in timepiece and the time data processing unit, and thereby processes the position coordinate data obtained by the GPS position determination and the time data in another independent time system by correlating them with each other. The interface unit is connected to an external circuit.

In accordance with another mode of the present invention, a position determining apparatus comprises a GPS antenna for receiving a radio wave from a GPS satellite, a GPS receiver for receiving the data from the GPS antenna to determine a position, a radio clock antenna for receiving a standard radio wave supplied from a standard radio wave transmitting station, and a radio clock for correcting the time with the time data of the standard radio wave received by the radio clock antenna, wherein the GPS receiver includes a processing unit. The processing unit processes the position coordinate data resulting from the GPS position determination and the time data obtained from the radio clock by correlating them with each other.

Preferably, the radio clock includes an amplifier and a time data processing unit. The radio wave received by the radio clock antenna is amplified by the amplifier and input into the time data processing unit to decode the time signal on the basis of a time code included in the radio wave and to determine the correct time data on the basis of the standard time in the time data processing unit.

The GPS receiver includes a GPS receiving unit for receiving the data received from the GPS antenna, memory means for storing the data including the received data, and a built-in timepiece for indicating the time on the basis of quartz oscillation.

The processing unit is connected to the GPS receiving unit, the memory means, the built-in timepiece and the time data processing unit, and thereby processes the position coordinate by the GPS position determination and the time data obtained from the radio clock by correlating them with each other.

Information about the time treated in the GPS position determination is extremely accurate, and the time is an important factor for indicating when the measurement is actually carried out. It is preferable that time or a point of time at a position determination information location is determined by a plurality of independent signals to ensure a kind of existence certification, thereby enabling the reliability to be enhanced in the position determination.

In another embodiment of the present invention, time or a point of time at a position determination information location is determined by a plurality of signals to ensure a kind of existence certification, thereby enabling the reliability to be enhanced in the position determination.

For example, an external standard time data in a system independent of the RTK is added to a result obtained by the RTK position determination.

In another preferred embodiment of the present invention, the treatments of the time data in the GPS system are as follows.:

In the GPS position determination, a time data obtained by the atomic clock built in the satellite is used. The atomic clock is a timepiece, in which cesium 133 atom is used and time is determined on the basis of its radiation, that is, a timepiece capable of indicating time at an accuracy, where a continuous time of 9,192,631,770 cycles in transitions between two super-fine levels of the ground state of cesium 133 correspond to a second, as specified by the international conference on the weights and measures. So, the error is basically less than one second per three hundred thousand years.

Alternately, hydrogen atom can be employed. However, the present invention is based on preferably the definition of the world atomic clock. It is the best way to use the atomic clock using cesium atom.

A satellite emanates a radio wave for position determination, in which case, the radio wave including information about time at which the radio wave is emanated. The propagation velocity of the radio wave can be determined by comparing the time at which the satellite emanates the radio wave with the time at which the receiver receives the radio wave.

The spatial coordinate at the location of position determination can be determined on the basis of the radio wave propagation velocity thus obtained.

Normally, a timepiece on the basis of quartz oscillation is used for the timepiece built in a receiver. By means of time synchronization in the GPS position determination system, the timepiece built in the receiver may operate in substantially the same precision as the atomic clock built in the GPS satellite.

The time synchronization described herein implies that the time count for the timepiece built in the receiver is synchronized with the time count for the atomic clock built in the GPS satellite with the aid of the received GPS radio wave, so that the time can be counted in the precision of the atomic clock.

A delay may occur in accordance with the state of propagating the GPS radio wave. However, such a delay can be corrected or eliminated by a navigation message from the satellite.

As described above, the time system having a very high accuracy on the basis of the atomic clock has commonly been established in the GPS system.

The standard time, which is used in another preferable embodiment of the invention, will be now described.

The universal time (UT) determined on the basis of the rotation of the earth itself has conventionally been used as a standard time in the world. However, the universal time (UT) has not been used as a measure of time or a time scale in a high precision, because the stability in quartz oscillation is superior to that in the spinning rotation of the earth.

On 1967, one second was defined, based on the frequency of the electromagnetic wave resulting from the quantum transition of the cesium atom, and thus the international atomic time TAI has been established as an original base time UT2 (the value being corrected on the basis of the season effect due to the rotation of the earth) at a time of 0 hour, 0 minute and 0 second on Jan. 1, 1958.

The respective nations have specified their own specific standard time by controlling the corresponding atomic clocks on the basis of the above-mentioned one second.

In Japan, the Japanese standard time (JST) was determined by the standard frequency determination section of the general communication research institute.

The Japanese standard time is provided in various methods, and the method of receiving the standard radio wave with a radio clock is typically used.

In this case, at present, the standard radio wave, long wave (40 kHz) having an output of 50 kW is emitted as the radio wave from the Ootakadoya-san (Mt. Ootakadoya).

The standard radio wave includes "the time code information". Specifically, information included in the time code comprises hour, minute, total day, year, week of the day, information about the intercalary second, parity, information about the stopping of the wave transmission and others. The hour, minute, total day, year and the week of day are represented in the binary decimal code (BCD).

As described above, the standard time is specifically defined in each nation. Regarding the standard radio wave, the frequency, the output, and the format are also defined specifically, so that the radio wave can be used by adjusting the conditions thereto.

In a preferred embodiment of the present invention, the time data in the results of the GPS position determination are treated as follows.:

Since an extremely accurate time system is used in the GPS system, it is possible to add the time in the position determination or in the analysis to the position coordinate obtained by the GPS position determination.

In this case, the GPS time inside the receiver is fundamentally defined as the time passed after the code reset.

When, therefore, the time is set to that in the standard time system, the time is obtained by adding the time (seconds) passed after the code reset to the reset time.

The Japanese standard time can be determined by adding the difference in time, i.e., 9 hours, to the above result of addition.

These treatments are carried out in a processing unit of the receiver. The results of processing are stored (recorded) in memory means (recording means). Moreover, the memory content can be displayed on display means, if necessary.

The international atomic time TAI has been defined as a mean value of the times determined by atomic clocks (cesium atomic clocks) used to determine the standard time in the respective nations by the International Bureau of Weights and Measures in France.

At present, a GPS time comparison technique is used for the cross reference of the standard times in the respective nations to obtain the averaged value thereof. In this technique, two stations on the ground observe the same satellite simultaneously, and then determine the differences between time in the timepiece of the satellite and that in the timepieces of respective stations. On the basis of the differences thus obtained, the times in the two stations can be compared with each other. Hence, the errors in machines other than the receiver systems in the ground may be eliminated, thereby enabling the times to be compared with each other in an extremely high precision.

However, since the international atomic time is determined from the mean value, the international atomic time corresponding to the standard time in each nation can later be ascertained.

On the other hand, the time in the GPS system is also determined by the atomic clock (cesium atomic clock) built in a satellite, and therefore has a delay of 19 seconds, which is the difference between the international standard time UTC and the international atomic time TAI, in which case, the starting point of the GPS time is the same as that in the former, i.e., Jan. 6, 1980. As a result, they are substantially equivalent with each other.

The international atomic time relative to the GPS time is compared with the standard time in each nation and the difference (time lag) therebetween is published.

As is clearly described in the above elucidation, the international atomic time and the standard time in each nation are compared with the GPS time, and thus the time lags (differences) therebetween are determined. The respective time systems have the same precision, and can be applied completely independently of each other.

The relationship between the respective time systems has been later provided. As a result, the time in one time system can be estimated after the time in the other time system is ascertained. However, it is impossible to simultaneously ascertain the time in one time system and that in the other time system.

If time in a time system different from the GPS time system is included in the data of the determined position, it follows that the position data is also verified in the other time system.

Moreover, if the difference between the GPS time system later given and the time system concerned is the same as the difference between the GPS time system in the position data and the time system concerned, it follows that the position data is verified to be determined in the position.

The method of introducing the data in the time system of the respective nations will be described.

The method of providing the standard time data is different from nation to nation, and several means are provided even in a nation. In Japan, for instance, the methods, in which either such a network circuit as a telephone circuit, an internet or the like is used, or the standard radio wave transmitted is received by a radio clock, are used.

BRIEF DESCRIPTION OF THE DRAWINGS

FIG. 3 shows an example of data stored in a memory means in a GPS position determination system according to an embodiment of the invention;

DESCRIPTION OF THE PREFERRED EMBODIMENTS

Figure 1:
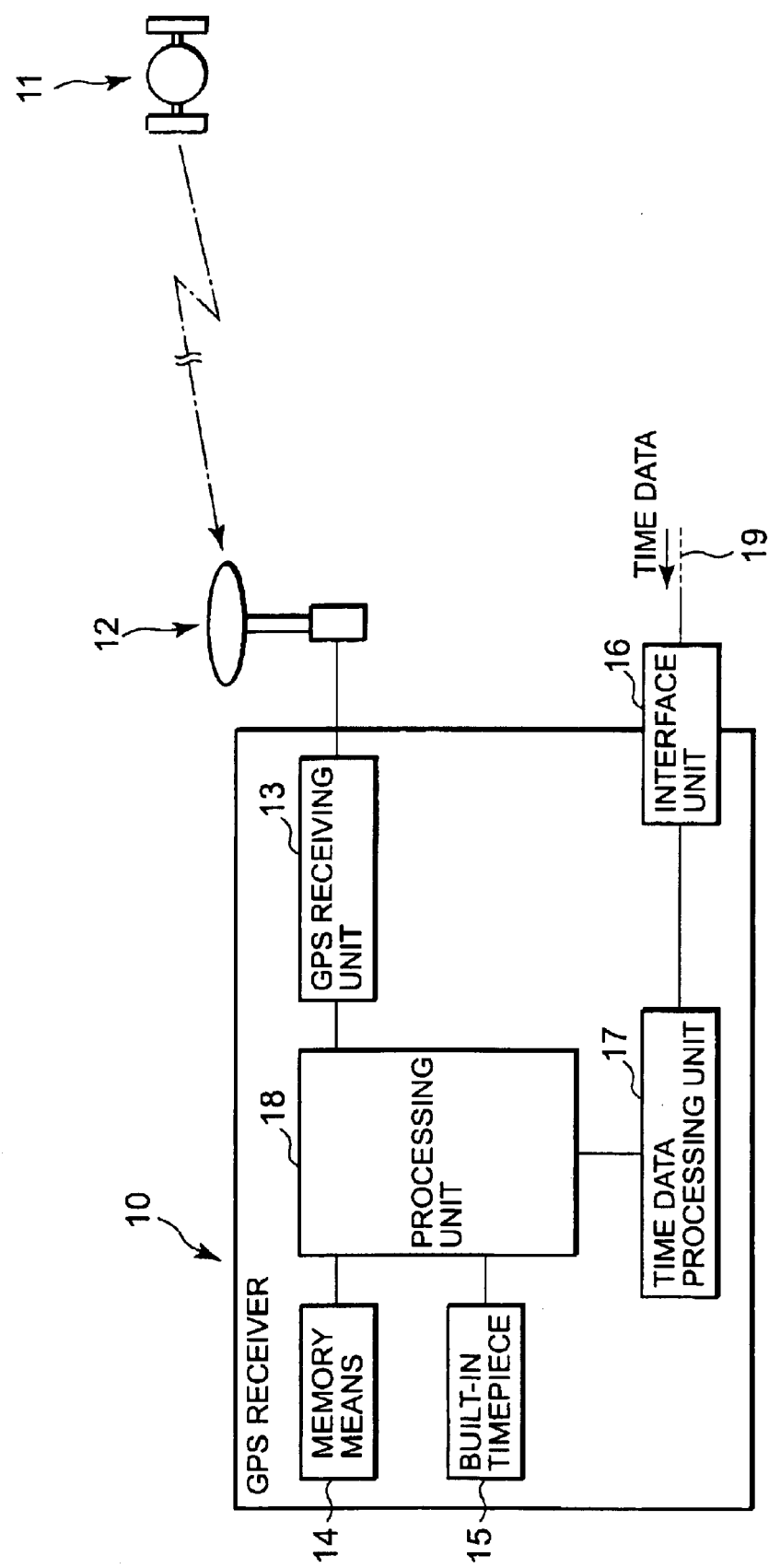
FIG. 1 shows a GPS position determination system according to a first embodiment of the invention.

In the following, preferred embodiments 1 and 2 according to the invention will be described, referring to the drawings.

Embodiment 1

FIG. 1 shows a GPS position determination system according to a first embodiment of the invention.

The GPS position determination system in FIG. 1 comprises a GPS receiver 10, a GPS satellite 11 and an antenna unit 12 for receiving the radio wave from the GPS satellite 11.

The GPS receiver 10 includes a GPS receiving unit 13 for receiving the data received by the GPS antenna unit 122, memory means 14 for storing various data including the received data, a built-in timepiece 15 for indicating the time based on quartz oscillation, an interface unit 16 for accepting the time data from the external time system completely independent of the GPS time system, and a time data processing unit 17 for processing the time data input from the interface unit 16 to form data in a usable format. The GPS receiver 10 further a processing unit 18 which is connected to the receiving unit 13, memory means 14, the built-in timepiece 15, the time data processing unit 17 and the like, and thereby processes the position coordinate data resulting from the GPS determination and the time data in the another independent time system by correlating them with each other.

FIG. 3 shows an example of data stored in the memory means 14.

The interface unit 16 is conneted to, for instance, an external circuit 19 (telephone circuit, exclusive circuit for a network, wireless circuit or the like).

The process of determining an accurate time from the time data supplied by the external circuit 19 is carried out in the time data processing unit 17. The function of the time data processing unit 17 can be executed by the processing unit 18.

Embodiment 2

Figure 2:
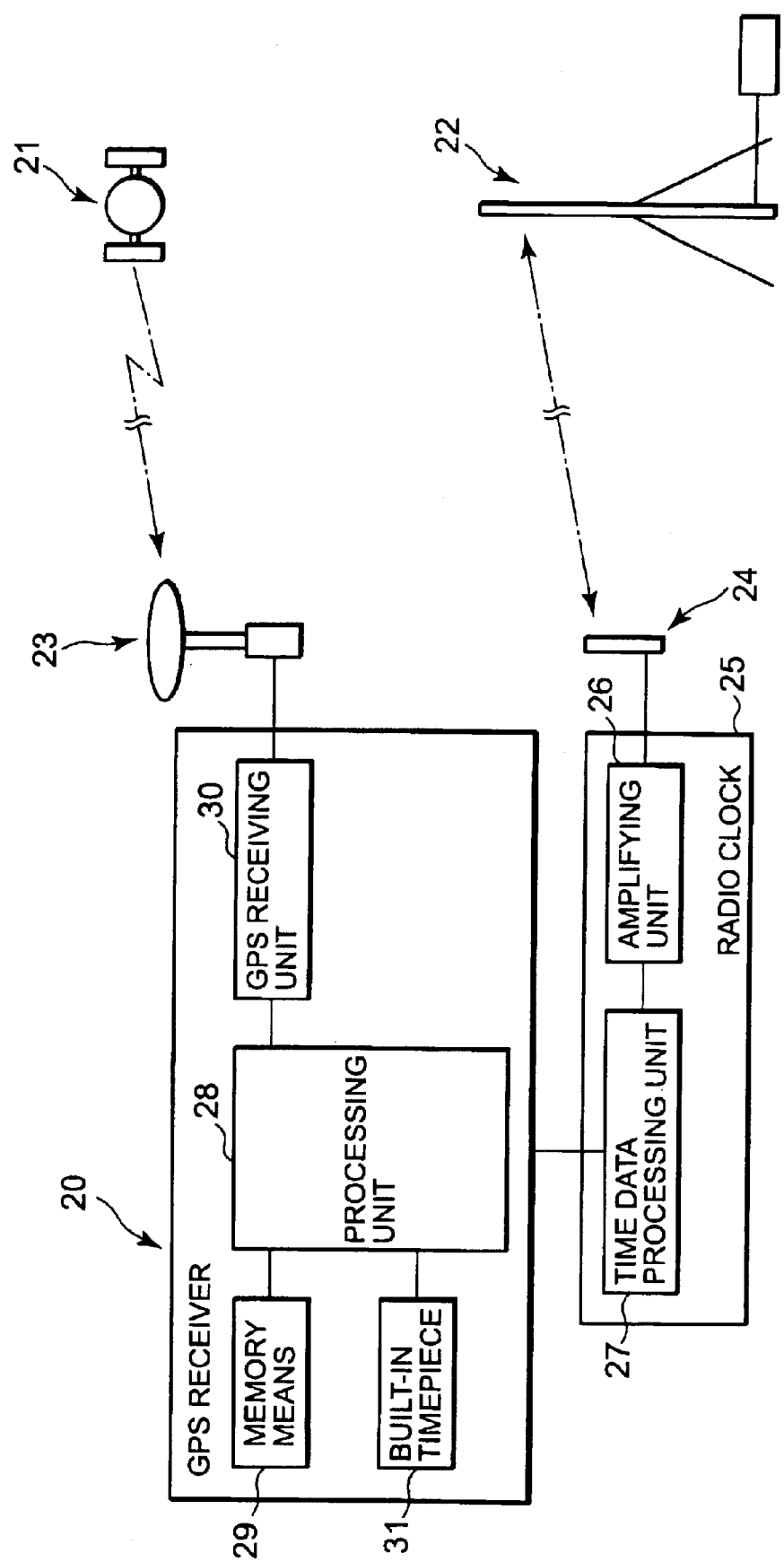
FIG. 2 shows a GPS position determination system according to a second embodiment of the invention.

FIG. 2 shows another embodiment of the invention.

Referring now to FIG. 2, a method in which a radio clock is used as means for receiving the standard time will be described.

A GPS position determination system in FIG. 2 comprises a GPS receiver 20, a GPS satellite 21, a standard radio wave transmitting station 22, a GPS antenna 23, a radio clock antenna 24, and a radio clock 25.

The radio clock 25 is a timepiece for receiving the standard radio wave transmitted from the standard radio wave transmitting station 22 with the antenna 24 to correct the time.

The radio clock 25 and the radio clock antenna 24 are connected to each other via a cable. The radio clock 25 is equipped with an amplifying unit 26 and a time data processing unit 27. The radio wave received by the radio clock antenna 24 is amplified by the amplifying unit 26 and then input into the time data processing unit 27. In the time data processing unit 27, a time signal is decoded, based on the time code included in the radio wave, thereby enabling accurate time data to be obtained on the basis of the standard time.

By applying the process of decoding in the time data processing unit 27, varied time codes in the respective nations can be used.

The time data thus obtained are input into a processing unit 28 of the GPS receiver 20.

The time data is added to the position coordinate data (position data) obtained by the GPS position determination.

The GPS receiver 20 includes a GPS receiving unit 30 for receiving the received data from the GPS antenna 23, memory means 29 for storing various data including the received data, a built-in timepiece 31 for indicating time on the basis of quartz oscillation, and the radio clock 25 for input of the time data from an external time system completely independent of the GPS time system. The radio clock 25 includes the time data processing unit 27 for amplifying the time data input from the radio clock antenna 24 to process the data in an usuable format and the amplifier 26. The GPS receiver 20 further includes the processing unit 28. The processing unit 28 is connected to the GPS receiving unit 30, memory means 29, the built-in timepiece 31, the time data processing unit 27 and the like to process the position coordinate data by the GPS position determination and the time data in the other independent time system by correlating them with each other.

Figure 4:
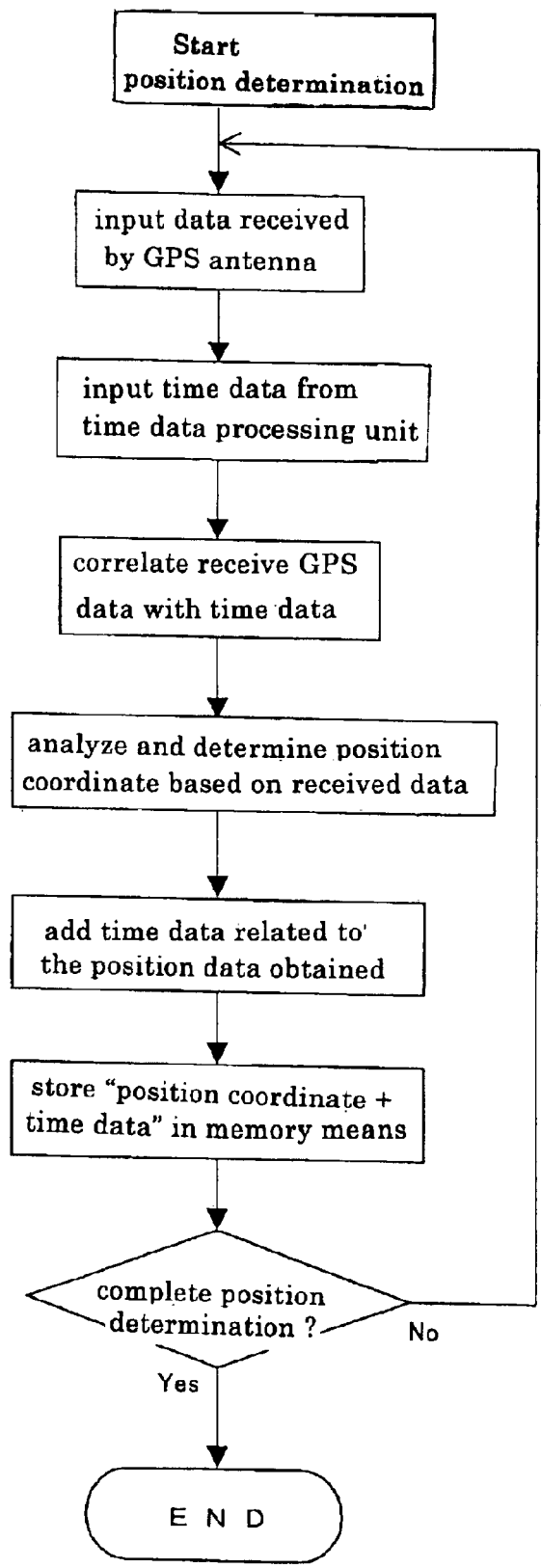
FIG. 4 shows an example of a data processing flow in the GPS position determination system.

Referring to FIG. 4, actual data processing in the processing unit 28 will be described.

When starting to perform the GPS position determination, the received data resulting from the radio wave, which is emitted from the satellite 21 and received by the GPS antenna 23, is input into the processing unit 28, and the standard time data is input thereinto in a predetermined timing from the time data processing unit 27. The predetermined timing is synchronized with the receiving.

The processing unit 28 correlates the received data with the standard time data. In the process of correlation, when the standard time data is obtained at the same timing as the received data is received, the synchronization is provided between these data. In other word, these data can be treated as data, which are simultaneously received.

The position coordinate is determined by the analysis on the basis of the received data. To the position coordinate data thus obtained, the standard time data correlated as above are added.

The position coordinate data are basically text data in the CSV format or the like (or text data in the NMEA format as a developed one), which are delimited into respective items, and therefore the standard time is added as a new item to the respective position coordinate data.

The position coordinate to which the standard time data is added is stored in memory means 29.

When the GPS position determination is not yet completed, the data received from the GPS antenna 23 is again input. In the case of being completed, the data processing is stopped.

In this case, the value for the position coordinate data obtained in the GPS time system is the GPS time obtained by the time-synchronization in the GPS receiver 20, and the time data added is the time data on the basis of the independent time system at the point of time when the radio wave from the GPS satellite 21 is received.

The time data in the GPS time system can be processed to become the form of time data by transforming it into the time which is determined in accordance with the position to be determined.

If, for instance, the position to be determined is a place in Japan, the GPS time is converted into the Japanese time by adding the initial time lag (13 seconds) relative to the GPS time to the difference in time (+9 hours) between the standard time and the time (standard time) at code reset.

This makes it easy to compare with the time data in the Japanese standard time, which will be later added.

Since, however, the transformation of the data format can be performed later, there is no principal problem both for the GPS time and for the standard time, so long as the format at the time obtained is stored.

In any of these embodiments, as shown in FIG. 3, it is possible to add the time data (in particular, the time data being regarded as a public value) set independent of the GPS system to the position data obtained by the GPS position determination, thereby enabling the publicity of the position data (i.e., being regarded as a public value to be ensured so that the reliability is enhanced as a kind of the existence verification.

What is claimed is:

1. A method, comprising the steps of:

determining a first time by a first determining system;

determining a second time and a spatial position of a terminal receiving the second time, by a second determining system which is different from and independent of the first determining system, and by the terminal, storing, in combination, the first time determined by the first determining system and the second time and the position determined by the second determining system, at each time of determining the spatial position of the terminal, in such a manner that the first time, the second time and the position are arranged in a row when they are outputted, wherein the first and second times are independent of each other.

2. A method as defined in claim 1, wherein the first determining system is a radio clock system, and the second determining system is a global positioning system (GPS).

3. A method as defined in claim 1, wherein the first determining system is a timepiece system for obtaining the standard time via an internet, and the second determining system is a global positioning system (GPS).

4. A method as defined in claim 1, wherein the terminal is a mobile device.

5. An apparatus comprising:
time means for determining a first time;
a global positioning system (GPS) antenna for receiving a radio wave from a GPS satellite in a GPS time system which is independent of the time means;
a GPS receiver for receiving position coordinate data and time data from the GPS antenna, the GPS receiver including a processing unit which processes the position coordinate data and time data so as to determine a second time and a position of the GPS receiver; and
means for storing, in combination, the first time, the second time and the position, at each time of determining the spatial position of the terminal, in such a manner that the first time, the second time and the position are arranged in a row when they are outoutted, wherein the first and second times are independent of each other.

6. An apparatus as defined in claim 5, wherein the time means includes an interface unit for receiving time data from an external time system independent of the GPS time system.

7. An apparatus as defined in claim 5, wherein the processing unit is connected to a built-in timepiece.

8. An apparatus as defined in claim 6, wherein the interface unit is connected to an external circuit.

9. An apparatus comprising:
a global positioning system (GPS) antenna for receiving a radio wave from a GPS satellite within a GPS time system;
a GPS receiver for receiving GPS time data and position data from the GPS antenna so as to determine the GPS time and position;
a radio clock antenna for receiving a standard radio wave supplied from a standard radio wave transmitting station which is independent of the GPS time system;
means for determining standard time on the basis of the standard radio wave received by the radio clock antenna; and
means for storing, in combination, the GPS time, the standard time and the position, at each time of determining the spatial position of the terminal, in such a manner that the first time, the second time and the position are arranaed in a row when they are outputted.

10. An apparatus as defined in claim 9, wherein the radio wave received by the radio clock antenna is amplified by an amplifier and then input into a time data processing unit, wherein a time signal is decoded on the basis of a time code included in the radio wave, and then accurate time data is determined on the basis of the standard time.

11. An apparatus as defined in claim 9, wherein the GPS receiver includes a GPS receiving unit for receiving the data received from the GPS antenna, and a built-in timepiece for indicating time on the basis of the data by quartz oscillation.

12. A position determining apparatus as defined in claim 10, further comprising a memory, wherein the standard time is added to the GPS time, as combined time data that is stored in the memory, when the GPS time data and position data is received by the GPS receiver.

13. A method as defined in claim 1, wherein the first time is arranged adjacent to the second time.

14. A method as defined in claim 13, wherein the first time is obtained from a particular country's time system in which the terminal is currently located.

15. An apparatus as defined in claim 5, wherein the first time is arranged adjacent to the second time.

16. An apparatus as defined in claim 15, wherein the first time is obtained from a particular country's time system in which the terminal is currently located.

17. An apparatus as defined in claim 9, wherein the first time is arranged adjacent to the second time.

18. An apparatus as defined in claim 17, wherein the first time is obtained from a particular country's time system in which the terminal is currently located.

* * * * *